United States Patent
Ye et al.

(10) Patent No.: US 10,203,563 B2
(45) Date of Patent: Feb. 12, 2019

(54) FORMING METHODS OF LIQUID CRYSTAL LAYERS, LIQUID CRYSTAL PANELS, AND LIQUID CRYSTAL DRIPPING DEVICES

(71) Applicant: Wuhan China Star Optoelectronics Technology Co., Ltd., Wuhan, Hubei (CN)

(72) Inventors: Guoliang Ye, Guangdong (CN); Bin Xiao, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 225 days.

(21) Appl. No.: 15/115,258

(22) PCT Filed: Jul. 20, 2016

(86) PCT No.: PCT/CN2016/090584
§ 371 (c)(1),
(2) Date: Jul. 28, 2016

(87) PCT Pub. No.: WO2017/215074
PCT Pub. Date: Dec. 21, 2017

(65) Prior Publication Data
US 2018/0196292 A1   Jul. 12, 2018

(30) Foreign Application Priority Data
Jun. 16, 2016 (CN) .......................... 2016 1 0435337

(51) Int. Cl.
*G02F 1/13*   (2006.01)
*G02F 1/1339*   (2006.01)
*G02F 1/1341*   (2006.01)

(52) U.S. Cl.
CPC .......... *G02F 1/1341* (2013.01); *G02F 1/1303* (2013.01); *G02F 1/1339* (2013.01); *G02F 2001/13415* (2013.01)

(58) Field of Classification Search
CPC ..... G02F 1/1341; G02F 1/1303; G02F 1/1339
See application file for complete search history.

(56) References Cited

U.S. PATENT DOCUMENTS

2004/0032558 A1   2/2004   Liu et al.
2004/0233373 A1*  11/2004  Ogimoto ............... G02F 1/1341
                                                         349/153

(Continued)

FOREIGN PATENT DOCUMENTS

| CN | 101008730 A | 8/2007 |
| CN | 101493596 A | 7/2009 |
| JP | 2007188113 A | 7/2007 |

*Primary Examiner* — Lucy P Chien
(74) *Attorney, Agent, or Firm* — Andrew C. Cheng

(57) ABSTRACT

The present disclosure relates to a formation method of liquid crystal layers, a liquid crystal panel, and a liquid crystal dripping device. A first dripping is applied toward a central area of the plastic frame of a first substrate, and a second dripping is applied toward a rim area of the plastic frame of a second substrate, wherein a liquid crystal amount of a single droplet with respect to the first dripping and the second dripping are different. That is, the dripping process applied to one substrate may be adjusted in accordance with the diffused result of the liquid crystals on the other substrate, such that the uniformity of the diffused liquid crystals may be enhanced. In addition, the issues, such as sealing puncture, edge gap, and bubble, may be avoided so as to enhance the product quality.

11 Claims, 3 Drawing Sheets

(56) References Cited

U.S. PATENT DOCUMENTS

2007/0095468 A1* 5/2007 Kim .................... B29C 47/0019
                                                              156/275.3
2007/0206152 A1   9/2007 Katsumura
2013/0168006 A1   7/2013 Kida

* cited by examiner

FORMING METHODS OF LIQUID CRYSTAL LAYERS, LIQUID CRYSTAL PANELS, AND LIQUID CRYSTAL DRIPPING DEVICES

BACKGROUND OF THE INVENTION

1. Field of the Invention

The present disclosure relates to liquid crystal display technology, and more particularly to an array substrate, a liquid crystal panel, and a liquid crystal device (LCD).

2. Discussion of the Related Art

LCD usually are made by bonding two substrate. During the cell process, the liquid crystals are dipped within a plastic frame of one of the substrate. Usually, a plurality of liquid crystal droplets with same weight are uniformly distributed on the substrate. Afterward, vacuum chamber (VAC) is adopted to bond the two substrates such that the liquid crystals distributed within the liquid crystal cell defined by the plastic frame.

The liquid crystal droplets are distributed in accordance with patterns. It can be understood that the amount of the droplet and the patterns may affect the diffusion effect of the liquid crystals. The issues, such as sealing puncture, edge gap, and bubble may occur if the droplets have not been uniformly distributed, which may reduce the quality of the products. For instance, as shown in FIG. 1, if a gap between the liquid crystal droplet 11 in a rim of the liquid crystal cell and the plastic frame 12 is too small, after the liquid crystal droplet 11 is diffused, sealing puncture may occur. If the gap between the liquid crystal droplet 11 at the second row and the plastic frame 12 is too large, after the liquid crystal droplet 11 diffused, the issue "edge gap" may occur, which may results in bubbles within the liquid crystal panel. In another example, referring to FIG. 2, if the gap between the liquid crystal droplet 21 in the rim of the liquid crystal cell and the plastic frame 22 is too large, after the liquid crystal droplet 21 is diffused, the issue "edge gap" may occur, which may results in bubbles within the liquid crystal panel. Also, if the gap between the adjacent liquid crystal droplets 21 is small, the quality of the product may be affected due to non-uniform distribution.

SUMMARY

The present disclosure relates to a formation method of liquid crystal layers, a liquid crystal panel, and a liquid crystal dripping device. With the proposed solutions, the uniformity of the liquid crystals may be enhanced, such that the issues, including sealing puncture, edge gap, and bubble, may be avoided. Thus, the quality of the products may be enhanced.

In one aspect, a formation method of liquid crystal layers includes: dripping a first droplet within a central area of a first plastic frame on one side of a first substrate; dripping a second droplet within a rim area of a second plastic frame on one side of a second substrate, wherein a liquid crystal amount of a single droplet with respect to the first dripping and the second dripping are different; bonding the first plastic frame with the second plastic frame to form a sealed liquid crystal cell between the first substrate and the second substrate, wherein after the first plastic frame and the second plastic frame are bonded, the rim area surrounds the central area, and liquid crystals relating to the first dripping and the second dripping are diffused to form the liquid crystal layer within the liquid crystal cell.

Wherein the first dripping includes: obtaining a theoretical liquid crystal amount according to a thickness, a length, and a width of the liquid crystal cell; obtaining a liquid crystal amount of the single droplet dripping into the central area of the first plastic frame in accordance with the theoretical liquid crystal amount and a desired pattern to be formed within the central area; and dripping the single droplets having the liquid crystal amount into the middle area to obtain a distance between the diffused single droplet and the first plastic frame.

Wherein the second dripping includes: dripping the single droplets having the liquid crystal amount into the rim area of the second plastic frame, and adjusting the liquid crystal amount of the single droplet according to a diffused result until a diameter of the diffused single droplet equals to the distance; and performing a dripping process after obtaining the liquid crystal amount of the single droplet and the desired pattern to be formed in the rim area.

Wherein a dripping pattern of the first dripping includes a matrix, and the dripping pattern of the second dripping includes a rectangle.

In another aspect, a liquid crystal panel includes: a first substrate, a second substrate, and a liquid crystal layer between the first substrate and the second substrate, a liquid crystal pattern of the liquid crystal layer includes a first pattern obtained by a first dripping and a second pattern obtained by a second dripping, the first dripping is applied to a central area of a first plastic frame on one side of the first substrate, the second dripping is applied to a rim area of a second plastic frame on one side of the second substrate, wherein a liquid crystal amount of a single droplet with respect to the first dripping and the second dripping are different, and the rim area surrounds the central area.

Wherein a dripping pattern of the first dripping includes a matrix, and the dripping pattern of the second dripping includes a rectangle.

In another aspect, a liquid crystal dripping device includes: a first infuser configured to drip at least one first droplet into a central area of a first plastic frame on one side of a first substrate; a second infuser configured to drip at least one second droplet into a rim area of a second plastic frame on one side of a second substrate, wherein a liquid crystal amount with respect to the second droplet and the first droplet are different; a bonder configured to bond the first plastic frame with the second plastic frame to form a sealed liquid crystal cell between the first substrate and the second substrate, wherein the rim area surrounds the central area after the first plastic frame is bonded with the second plastic frame, and liquid crystals dripped by the first droplet and the second droplet are diffused within the liquid crystal cell to form a liquid crystal layer.

Wherein the first infuser is configured to: obtain a theoretical liquid crystal amount according to a thickness, a length, and a width of the liquid crystal cell; obtain a liquid crystal amount of the single droplet dripping into the central area of the first plastic frame in accordance with the theoretical liquid crystal amount and a desired pattern to be formed within the central area; and drip the single droplets having the liquid crystal amount into the middle area to obtain a distance between the diffused single droplet and the first plastic frame.

Wherein the second infuser is configured to: drip the single droplets having the liquid crystal amount into the rim area of the second plastic frame, and adjust the liquid crystal amount of the single droplet according to a diffused result until a diameter of the diffused single droplet equals to the distance; and perform a dripping process after obtaining the liquid crystal amount of the single droplet and the desired pattern to be formed in the rim area.

Wherein a dripping pattern of the first dripping includes a matrix, and the dripping pattern of the second dripping includes a rectangle.

In view of the above, the dripping process is applied to two substrates, and the liquid crystal amounts of single droplet dripping into the two substrates are different. Thus, the dripping process of the liquid crystals applied to one substrate may be adjusted according to the diffused result of the liquid crystals on another substrate so as to enhance the uniformity of the diffused liquid crystals. Thus, the issues, such as sealing puncture, edge gap, and bubble, may be avoided, such that the performance of the liquid crystal panel may be enhanced.

DETAILED DESCRIPTION OF THE EMBODIMENTS

One of the objects of the present disclosure is to drip the liquid crystals respectively into the two substrates of the liquid crystal panel. The amounts of the single liquid crystal droplet dripped into the two substrates are different so as to enhance the uniformity of the liquid crystals within the liquid crystal cell. In this way, the issues, such as sealing puncture, edge gap, and bubble, may be avoided, such that the performance of the liquid crystal panel may be enhanced.

Embodiments of the invention will now be described more fully hereinafter with reference to the accompanying drawings, in which embodiments of the invention are shown.

Figure 1:
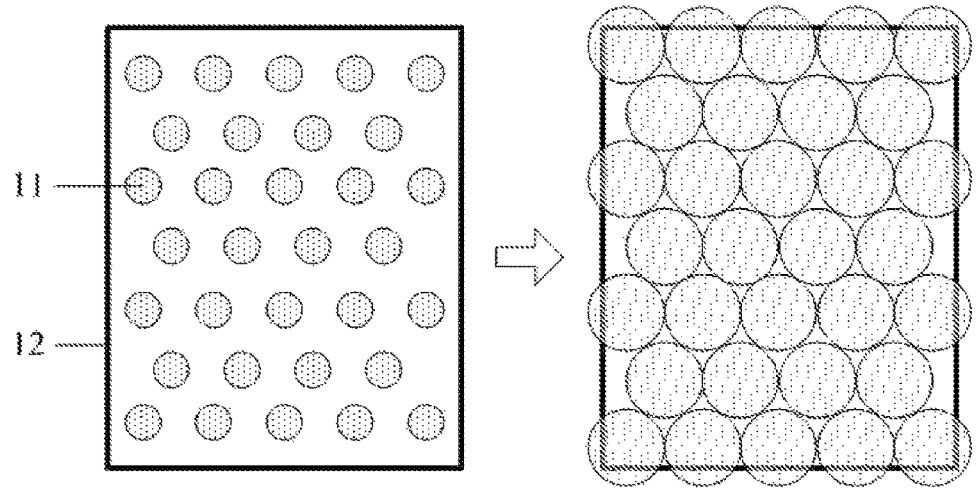
FIG. 1 is a schematic view of conventional liquid crystal dripping and diffusion.
Figure 2:
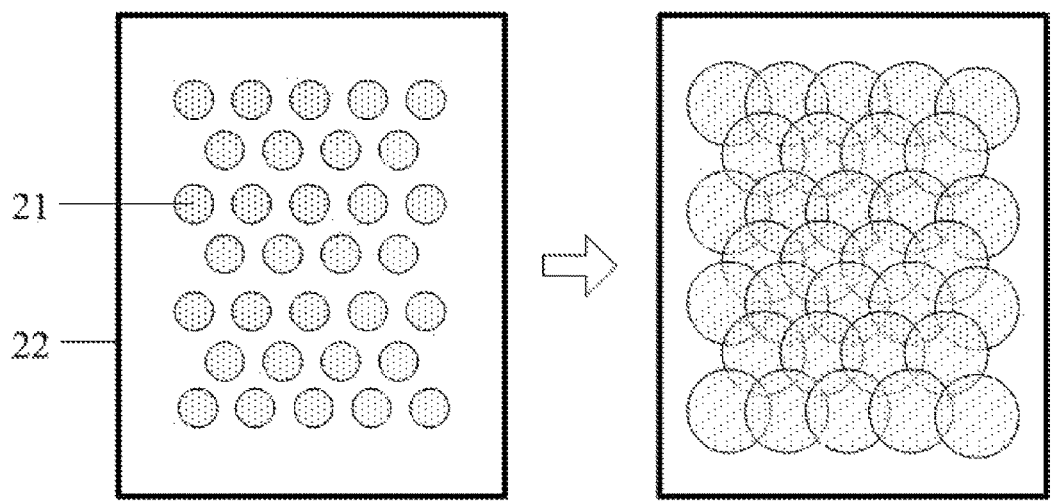
FIG. 2 is another schematic view of conventional liquid crystal dripping and diffusion.
Figure 3:
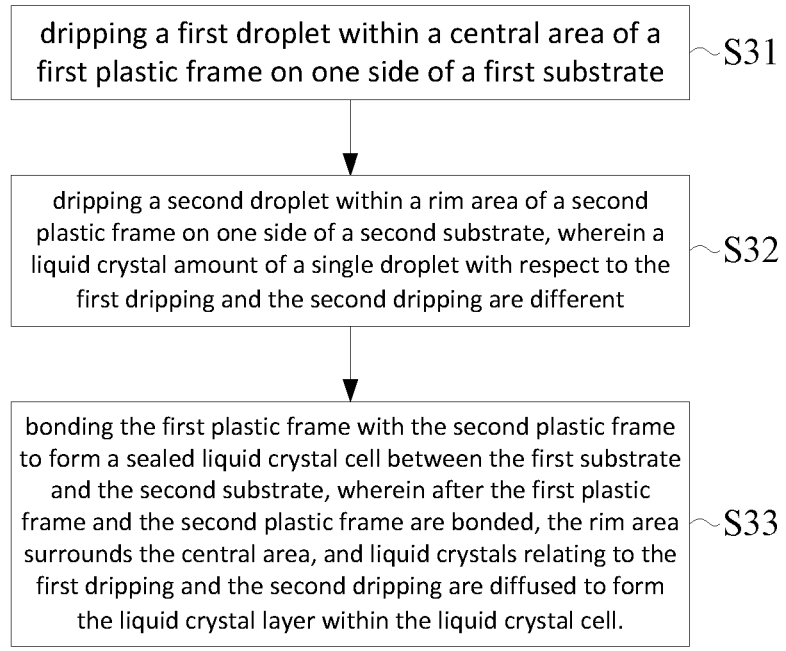
FIG. 3 is a flowchart illustrating the formation method of liquid crystal layers in accordance with one embodiment.

FIG. 3 is a flowchart illustrating the formation method of liquid crystal layers in accordance with one embodiment. The method includes the following steps.

In step S31, applying a first dripping toward a central area of a first plastic frame on one side of a first substrate.

In step S32, applying a second dripping toward a rim area of a second plastic frame on one side of a second substrate, wherein a liquid crystal amount of the single droplet with respect to the first dripping and the second dripping are different.

In step S33, bonding the first plastic frame with the second plastic frame so as to form a sealed liquid crystal cell between the first substrate and the second substrate. Edges of the sealed liquid crystal cell are symmetrical with respect to the central area, and the liquid crystals relating to the first droplet and the second droplet are diffused to form the liquid crystal layer within the liquid crystal cell.

Figure 4:
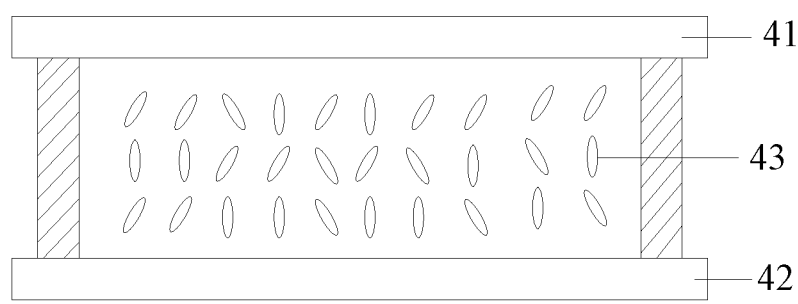
FIG. 4 is a schematic view showing the liquid crystal dripping in accordance with the method of FIG. 3.

Referring to FIG. 4, the liquid crystal panel 40 includes a color filter (CF) substrate 41, a thin film transistor (TFT) substrate 42, and liquid crystals 43 between the two substrates. In one embodiment, the first substrate may be one of the CF substrate 41 and the TFT substrate 42, and the second substrate may be the other one of the CF substrate 41 and the TFT substrate 42. In the example below, the first substrate is the CF substrate 41, and the second substrate is the TFT substrate 42.

Figure 5:
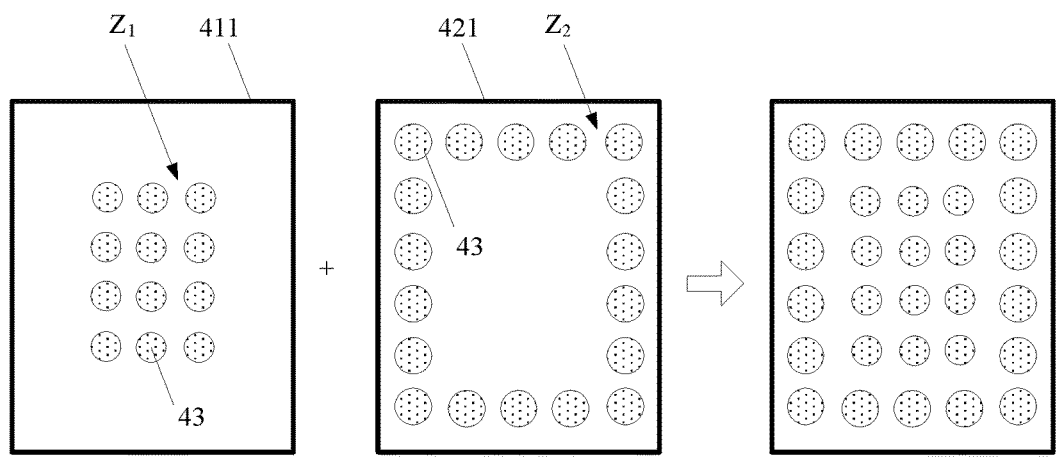
FIG. 5 is a cross-sectional view of the liquid crystal panel in accordance with one embodiment.

Referring to FIG. 5, a first plastic frame 411 is arranged on one side of the CF substrate 41, and a second plastic frame 421 is arranged on one side of the TFT substrate 42. The two plastic frames are bonded together to form the sealed liquid crystal cell for receiving the liquid crystals 43. After the liquid crystal cell is formed, the central area ($Z_1$) of the first plastic frame 411 and the rim area ($Z_2$) of the 421 cooperatively define the liquid crystal cell.

The above method relates to drip the first droplet and the second droplet respectively into the first plastic frame 411 and the second plastic frame 421, and the amounts of the liquid crystals with respect to the first droplet and the second droplet are configured to be different. Accordingly, the diffused result of the liquid crystals 43 within the second plastic frame 421 may be adjusted in accordance with the diffused result of the liquid crystals 43 within the first plastic frame 411. Alternatively, the diffused result of the liquid crystals 43 within the first plastic frame 411 may be adjusted in accordance with the diffused result of the liquid crystals 43 within the second plastic frame 421. That is, the diffused result of the liquid crystals 43 within one substrate may be adjusted in accordance with the diffused result of the liquid crystals 43 within the other substrate. In this way, the liquid crystals 43 may be uniformly diffused within the liquid crystal cell formed by bonding together two substrate so as to avoid the issues, such as sealing puncture, edge gap, and bubble, may be avoided, such that the performance of the liquid crystal panel 40 may be enhanced.

The dripping principle and the process relating to the above-mentioned adjustment will be described hereinafter.

The dripping principle and the process relating to the first droplet will be described below:

After confirming the model of the liquid crystal panel 40, the dimension of the liquid crystal cell is confirmed. The volume of the liquid crystal cell may be obtained in accordance with the thickness, the length, and the width. Afterward, the theoretical amounts of the liquid crystals needed by the liquid crystal panel 40 may be obtained in accordance with the equation: $m=\rho*h*l*d$, wherein m relates to the theoretical amount of the liquid crystals, and h, l and d respectively relates to the thickness, the length, and the width of the liquid crystal cell.

The liquid crystal amount of the single droplet dripping into the central area ($Z_1$) may be obtained in accordance with the theoretical liquid crystal amount, and the desired pattern within the central area ($Z_1$) of the first plastic frame 411. In an example, as shown in FIG. 5, the desired pattern within the central area ($Z_1$) is a matrix, an appropriate number of the droplets may be obtained by equaling the length and the width of the central area ($Z_1$) by a plurality of times so as to ensure the distance between two adjacent liquid crystal droplets 43 is within a predetermined threshold, wherein the predetermined threshold is configured to ensure that two adjacent liquid crystal droplets 43 may abut against each other after the liquid crystals are diffused within the liquid crystal cell. The predetermined threshold may be obtained by experience or by a plurality of experiments. Afterward, the theoretical liquid crystal amount of the central area ($Z_1$) may be obtained by a ratio of the central area ($Z_1$) to the liquid crystal cell. In the end, the amount of the liquid crystal droplets within the central area ($Z_1$) may be obtained by the number of the liquid crystal droplets within the central area ($Z_1$).

The single droplets with the liquid crystal amount are dripped into the central area ($Z_1$) to obtain the distance between the diffused single droplet 43 and the first plastic frame 411.

The dimension occupied by the liquid crystal droplets 43 within the central area ($Z_1$), after being diffused, may be greater than or small than the central area ($Z_1$) such that a remaining area of the liquid crystal cell may not equal with the rim area ($Z_2$) of the second plastic frame 421. Thus, the liquid crystal amount of the single droplet 43 dripped into the rim area ($Z_2$) has to be adjusted.

The principle and the process relating to the second dripping will be described below:

The single droplet 43 having the liquid crystal amount is dripped into the rim area ($Z_2$) of the second plastic frame 421, and the diffused result of the single droplet 43 is observed. Afterward, the liquid crystal amount of the single droplet 43 is adjusted until the diameter of the single droplet 43 equals to the above distance. In the end, the liquid crystal amount of the single droplet 43 and the desired liquid crystal pattern are obtained, and the dripping process is applied to the remaining area of the rim area ($Z_2$).

Referring to FIG. 5, the first droplet having the liquid crystal amount is dripped into the rim area ($Z_2$). Specifically, the first single droplets 43 are dripped into a vertex of the rim area ($Z_2$). Afterward, the liquid crystal amount of the single droplet 43 is adjusted according to the diffused result until the diameter of the single droplet 43, after being diffused, equals to the above distance. That is, the diffused single droplet 43 abuts against two edges of the second plastic frame 421 intersecting with each other, and the diffused single droplet 43 abuts against the edges of occupied area of the diffused single droplet 43. The number of the droplets within the rim area ($Z_2$) may be obtained by the liquid crystal amount of the single droplet 43 and the desired pattern within the rim area ($Z_2$) of the second plastic frame 421, i.e., rectangle.

It can be understood that the liquid crystal panel 40, and the patterns of the central area ($Z_1$) and the rim area ($Z_2$) may be of other shapes. For instance, when the liquid crystal panel 40 is elliptical, the central area ($Z_1$) and the rim area ($Z_2$) may be elliptical.

Figure 6:
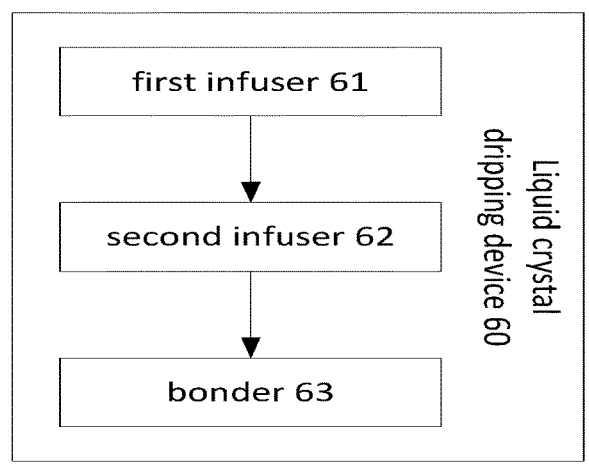
FIG. 6 is a schematic view of the liquid crystal dripping device in accordance with one embodiment.

FIG. 6 is a schematic view of the liquid crystal dripping device in accordance with one embodiment. Referring to FIGS. 4 and 6, the liquid crystal dripping device 60 includes a first infuser 61, a second infuser 62, and a bonder 63. The first infuser 61 is configured to drip the first droplet into the central area ($Z_1$) of the first plastic frame 411 on one side of the first substrate 41. The second infuser 62 is configured to drip the second droplet into the rim area ($Z_2$) of the second plastic frame 412 on one side of the second substrate 42, wherein the liquid crystal amounts with respect to the second droplet and the first droplet are different. The bonder 63 is configured to bond the first plastic frame 411 with the second plastic frame 421 to form the sealed liquid crystal cell between the first substrate 41 and the second substrate 42. After being bonded, the rim area ($Z_2$) surrounds the central area ($Z_1$), and the liquid crystals 43 dripped by the first droplet and the second droplet are diffused within the liquid crystal cells to form the liquid crystal layer.

The first infuser 61 and the second infuser 62 may be general liquid crystal nozzles, and the dripping principles and the processes of the first infuser 61 and the second infuser 62 may be referenced in the above disclosure.

In view of the above, the diffused result of the liquid crystals 43 within the second plastic frame 421 may be adjusted in accordance with the diffused result of the liquid crystals 43 within the first plastic frame 411. Alternatively, the diffused result of the liquid crystals 43 within the first plastic frame 411 may be adjusted in accordance with the diffused result of the liquid crystals 43 within the second plastic frame 421. That is, the diffused result of the liquid crystals 43 within one substrate may be adjusted in accordance with the diffused result of the liquid crystals 43 within the other substrate. In this way, the liquid crystals 43 may be uniformly diffused within the liquid crystal cell formed by bonding together two substrate so as to avoid the issues, such as sealing puncture, edge gap, and bubble, may be avoided, such that the performance of the liquid crystal panel 40 may be enhanced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A formation method of liquid crystal layers, comprising:

performing a first dripping of at least one first single droplet within a central area of a first plastic frame on one side of a first substrate;

performing a second dripping of at least one second single droplet within a rim area of a second plastic frame on one side of a second substrate, wherein a liquid crystal amount of the at least one first single droplet is different from a liquid crystal amount of the at least one second single droplet;

bonding the first plastic frame with the second plastic frame to form a sealed liquid crystal cell between the first substrate and the second substrate, wherein after the first plastic frame and the second plastic frame are bonded, the rim area surrounds the central area, and liquid crystals relating to the first dripping and the second dripping are diffused to form the liquid crystal layer within the liquid crystal cell;

wherein performing the second dripping comprises:

dripping one second single droplet having the liquid crystal amount into the rim area of the second plastic frame, and adjusting the liquid crystal amount of the at least one second single droplet according to a diffused result until a diameter of the diffused second single droplet equals to a distance between the diffused first single droplet and the first plastic frame; and performing a dripping process after obtaining the liquid crystal amount of the second single droplet and the desired pattern to be formed in the rim area.

2. The method as claimed in claim 1, wherein performing the first dripping of the at least one first single droplet comprises:

obtaining a theoretical liquid crystal amount according to a thickness, a length, and a width of the liquid crystal cell;

obtaining a liquid crystal amount of the first single droplet dripping into the central area of the first plastic frame in accordance with the theoretical liquid crystal amount and a desired pattern to be formed within the central area; and dripping the at least one first single droplet having the liquid crystal amount into the middle area to obtain the distance between the diffused first single droplet and the first plastic frame.

3. The method as claimed in claim 1, wherein a dripping pattern of the at least one first droplet comprises a matrix, and the dripping pattern of the at least one second droplet comprises a rectangle.

4. A liquid crystal panel, comprising:
a first substrate, a second substrate, and a liquid crystal layer between the first substrate and the second substrate, a liquid crystal pattern of the liquid crystal layer comprises a first pattern obtained by a first dripping of at least one first single droplet and a second pattern obtained by a second dripping of at least one second single droplet, the at least one first droplet is dripped within a central area of a first plastic frame on one side of the first substrate, the at least one second droplet is dripped within a rim area of a second plastic frame on one side of the second substrate, wherein a liquid crystal amount of the at least one first single droplet is different from a liquid crystal amount of the at least one second single droplet, and the rim area surrounds the central area;
wherein a diameter of the diffused second single droplet equals to a distance between the diffused first single droplet and the first plastic frame.

5. The liquid crystal panel as claimed in claim 4, wherein a dripping pattern of the at least one first droplet comprises a matrix, and the dripping pattern of the at least one second droplet comprises a rectangle.

6. A liquid crystal dripping device, comprising:
a first infuser configured to performing a first dripping of at least one first single droplet into a central area of a first plastic frame on one side of a first substrate;
a second infuser configured to performing a second dripping of at least one second single droplet into a rim area of a second plastic frame on one side of a second substrate, wherein a liquid crystal amount of the at least one first single droplet is different from a liquid crystal amount of the at least one second single droplet;
a bonder configured to bond the first plastic frame with the second plastic frame to form a sealed liquid crystal cell between the first substrate and the second substrate, wherein the rim area surrounds the central area after the first plastic frame is bonded with the second plastic frame, and liquid crystals dripped by the first droplet and the second droplet are diffused within the liquid crystal cell to form a liquid crystal layer;
wherein the second infuser is further configured to:
drip one second single droplet having the liquid crystal amount into the rim area of the second plastic frame, and adjust the liquid crystal amount of the at least one second single droplet according to a diffused result until a diameter of the diffused second single droplet equals to a distance between the diffused first single droplet and the first plastic frame; and
perform a dripping process after obtaining the liquid crystal amount of the second single droplet and the desired pattern to be formed in the rim area.

7. The liquid crystal dripping device as claimed in claim 6, wherein the first infuser is configured to:
obtain a theoretical liquid crystal amount according to a thickness, a length, and a width of the liquid crystal cell;
obtain a liquid crystal amount of the first single droplet dripping into the central area of the first plastic frame in accordance with the theoretical liquid crystal amount and a desired pattern to be formed within the central area; and
drip the at least one first single droplet having the liquid crystal amount into the middle area to obtain the distance between the diffused first single droplet and the first plastic frame.

8. The liquid crystal dripping device as claimed in claim 6, wherein a dripping pattern of the at least one first droplet comprises a matrix, and the dripping pattern of the at least one second droplet comprises a rectangle.

9. The liquid crystal dripping device as claimed in claim 6, wherein each of the at least one second single droplet has the same liquid crystal amount.

10. The method as claimed in claim 1, wherein each of the at least one second single droplet has the same liquid crystal amount.

11. The liquid crystal panel as claimed in claim 4, wherein each of the at least one second single droplet has the same liquid crystal amount.

* * * * *